United States Patent
Keating et al.

(10) Patent No.: US 7,557,863 B2
(45) Date of Patent: Jul. 7, 2009

(54) DIGITAL DISPLAY JITTER CORRECTION APPARATUS AND METHOD

(75) Inventors: Stephen J. Keating, Sunnyvale, CA (US); Russel Martin, Menlo Park, CA (US); Victor M. Da Costa, Santa Cruz, CA (US); Gyudong Kim, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 488 days.

(21) Appl. No.: 11/219,323

(22) Filed: Sep. 1, 2005

(65) Prior Publication Data

US 2006/0055822 A1 Mar. 16, 2006

Related U.S. Application Data

(63) Continuation of application No. 09/922,990, filed on Aug. 3, 2001, now Pat. No. 6,961,095.

(60) Provisional application No. 60/222,859, filed on Aug. 4, 2000.

(51) Int. Cl.
H04N 9/64 (2006.01)
G06K 19/06 (2006.01)

(52) U.S. Cl. .................... 348/497; 369/275.3

(58) Field of Classification Search ........... 348/497, 348/625, 606, 627, 628, 631, 910; 369/275.3; 375/371, 226
See application file for complete search history.

(56) References Cited

U.S. PATENT DOCUMENTS

| | | | |
|---|---|---|---|
| 4,126,886 A | 11/1978 | Takahara et al. | |
| 4,193,085 A | 3/1980 | Imamura | |
| 4,718,074 A * | 1/1988 | Mannas et al. | 375/371 |
| 4,866,692 A | 9/1989 | Saito et al. | |
| 4,987,491 A | 1/1991 | Kaite et al. | |
| 5,280,345 A | 1/1994 | Uehara et al. | |
| 5,291,526 A | 3/1994 | Ichikawa et al. | |
| 5,452,333 A * | 9/1995 | Guo et al. | 375/371 |
| 5,754,764 A | 5/1998 | Davis et al. | |
| 5,761,254 A * | 6/1998 | Behrin | 375/355 |
| 5,796,796 A | 8/1998 | Wang | |
| 5,923,377 A * | 7/1999 | Kenmochi et al. | 348/497 |
| 6,064,679 A * | 5/2000 | Hashemi et al. | 370/513 |
| 6,078,552 A * | 6/2000 | Yamamoto et al. | 369/47.51 |
| 6,088,323 A | 7/2000 | Kobayashi et al. | |
| 6,157,606 A * | 12/2000 | Inazawa et al. | 369/116 |
| 6,181,659 B1 | 1/2001 | Kobayashi et al. | |

(Continued)

OTHER PUBLICATIONS

Silicon Image, PanelLink® Technology, Using the Data Enable Signal in a Digital Monitor, Revision A, May 7, 1999, pp. 1-9.

*Primary Examiner*—Paulos M Natnael
(74) *Attorney, Agent, or Firm*—Perkins Coie LLP

(57) ABSTRACT

A jitter correction apparatus and method are disclosed. In one embodiment, the apparatus has a rising edge corrector to receive a jittered signal and to output a jitter corrected rising edge of the jittered signal. The apparatus may also have a falling edge corrector to receive the jittered signal and to output a jitter corrected falling edge of the jittered signal. The jitter correction apparatus may include an output device to receive the jitter corrected rising edge, to receive the jitter corrected falling edge, and to output a jitter corrected signal.

45 Claims, 12 Drawing Sheets

U.S. PATENT DOCUMENTS

| | | |
|---|---|---|
| 6,226,243 B1 * | 5/2001 | Kobayashi et al. ....... 369/47.17 |
| 6,256,003 B1 | 7/2001 | Tsuchiya et al. |
| 6,310,851 B1 | 10/2001 | Tobita et al. |
| 6,469,969 B2 | 10/2002 | Carson et al. |
| 6,556,249 B1 | 4/2003 | Taylor et al. |
| 6,556,640 B1 | 4/2003 | Baba |
| 6,606,360 B1 | 8/2003 | Dunning et al. |
| 6,961,095 B2 * | 11/2005 | Keating et al. .............. 348/497 |

* cited by examiner

DIGITAL DISPLAY JITTER CORRECTION APPARATUS AND METHOD

CROSS REFERENCE TO RELATED APPLICATION

This application is a continuation of U.S. patent application Ser. No. 09/922,990 for a DIGITAL DISPLAY JITTER CORRECTION APPARATUS AND METHOD filed on Aug. 3, 2001, now U.S. Pat. No. 6,961,095 which claims the priority of U.S. Provisional Patent Application No. 60/222,859 filed on Aug. 4, 2000, both of which are incorporated herein by reference.

FIELD OF THE INVENTION

The present invention relates generally to the field of signal processing and more specifically to the field of digital display control.

BACKGROUND OF THE INVENTION

Televisions and computer screens are used to view images. The transmissions of those images are sequenced by control signals that are sent with the image. If these control signals are not stable in relation to the image, the image will not be displayed correctly. Of particular importance in television and cathode ray tube (CRT) displays are the Horizontal and Vertical Retrace signals respectively known as Hsync and Vsync.

When a transmission is generated or processed through digital circuitry, the transmitted signals, e.g., image or control signals, can be processed incorrectly. The incorrect processing can move the signal positions relative to other portions of the transmitted signals. The resulting difference in relative position, may be influenced by a variety of variables such as the electronic circuit fabrication process or the temperature of the circuit, for example. Because display signals are repeated thousands of times per second, the interaction of the misprocessed signals can cause the position of the signal to move over time, which is known as jitter. This jitter creates a distortion on the resulting image, which is visible to viewers of the display.

In the context of television and CRT displays, the Hsync signal can suffer from jitter that shifts the Hsync signal forward or backward by at least one clocking cycle. If the jittered Hsync signal is used to time the transmission of video data, the resulting video image will be distorted. Thus because of its unreliability, the Hsync signal is not used to time the transmission of video data.

SUMMARY OF THE INVENTION

A jitter correction apparatus and method are disclosed. In one embodiment, the apparatus has a rising edge corrector to receive a jittered signal and to output a jitter corrected rising edge of the jittered signal. The apparatus may also have a falling edge corrector to receive the jittered signal and to output a jitter corrected falling edge of the jittered signal. The jitter correction apparatus may include an output device to receive the jitter corrected rising edge, to receive the jitter corrected falling edge, and to output a jitter corrected signal.

Various embodiments of the present invention will be more fully understood in light of the following detailed description taken together with the accompanying drawings.

BRIEF DESCRIPTION OF THE DRAWINGS

Jitter correction is illustrated by way of example and not limitation in the figures of the accompanying drawings, in which like references indicate similar elements, and in which.

DETAILED DESCRIPTION

A digital display jitter correction apparatus and method are disclosed. In one embodiment, the apparatus has a rising edge corrector to receive a jittered signal and to output a jitter corrected rising edge of the jittered signal. The apparatus may also have a falling edge corrector to receive the jittered signal and to output a jitter corrected falling edge of the jittered signal. The jitter correction apparatus may include an output device to receive the jitter corrected rising edge, to receive the jitter corrected falling edge, and to output a jitter corrected signal.

The jitter correction apparatus can be used to correct a signal, such as a periodic signal for example, that is affected by jitter using another signal that is not affected, or is relatively less affected, by jitter. The jitter correction may be scalable, so that the apparatus and method may be adjusted for different amounts of jitter. The jitter correction may be used to remove jitter from a deserialized signal which is derived from a serialized signal.

Figure 1:
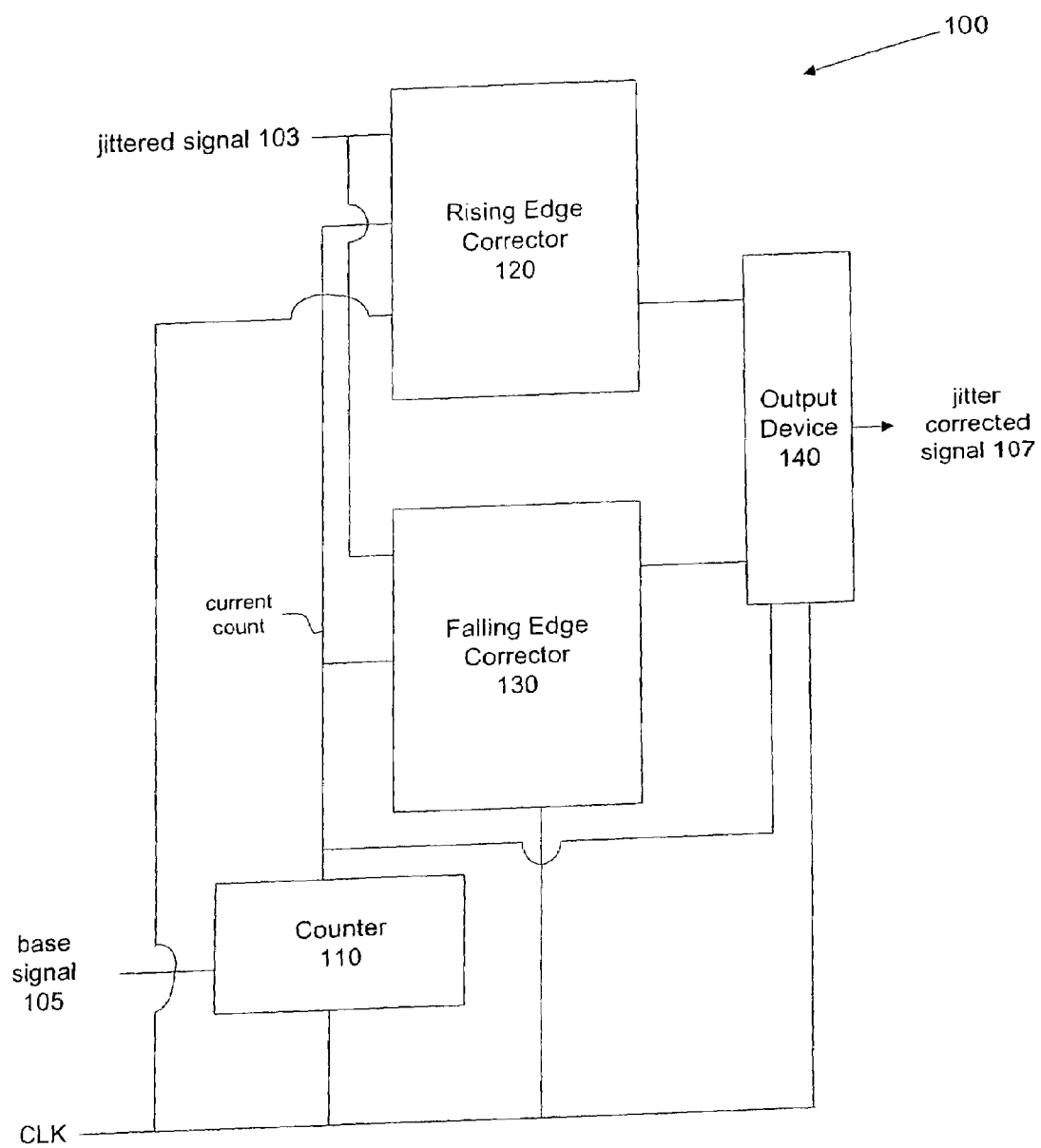
FIG. 1 shows a block diagram of an embodiment of a jitter correction apparatus.

FIG. 1 shows a block diagram of an embodiment of jitter correction apparatus 100. Apparatus 100 can be implemented as software instructions stored on a computer readable medium, such as a digital memory device for example, and executed by a computer processing system, such as a microprocessor, for example. The apparatus may also be implemented using hardware circuitry, or a combination of hardware and software. In this embodiment, jittered signal 103 is a video signal, such as a periodic signal for example, that is affected by jitter. Base signal 105 is a signal that is not affected by jitter or is affected by jitter less than jittered signal 103. In this embodiment, base signal 105 is in an active state when data is being transmitted on jittered signal 103. Apparatus 100 processes jittered signal 103 using base signal 105 to output jitter corrected signal 107, which is a jitter corrected version of jittered signal 103. The jitter corrected signal 107 may be output to a display device, such as a liquid crystal display (LCD) for example, and displayed.

Figure 2:
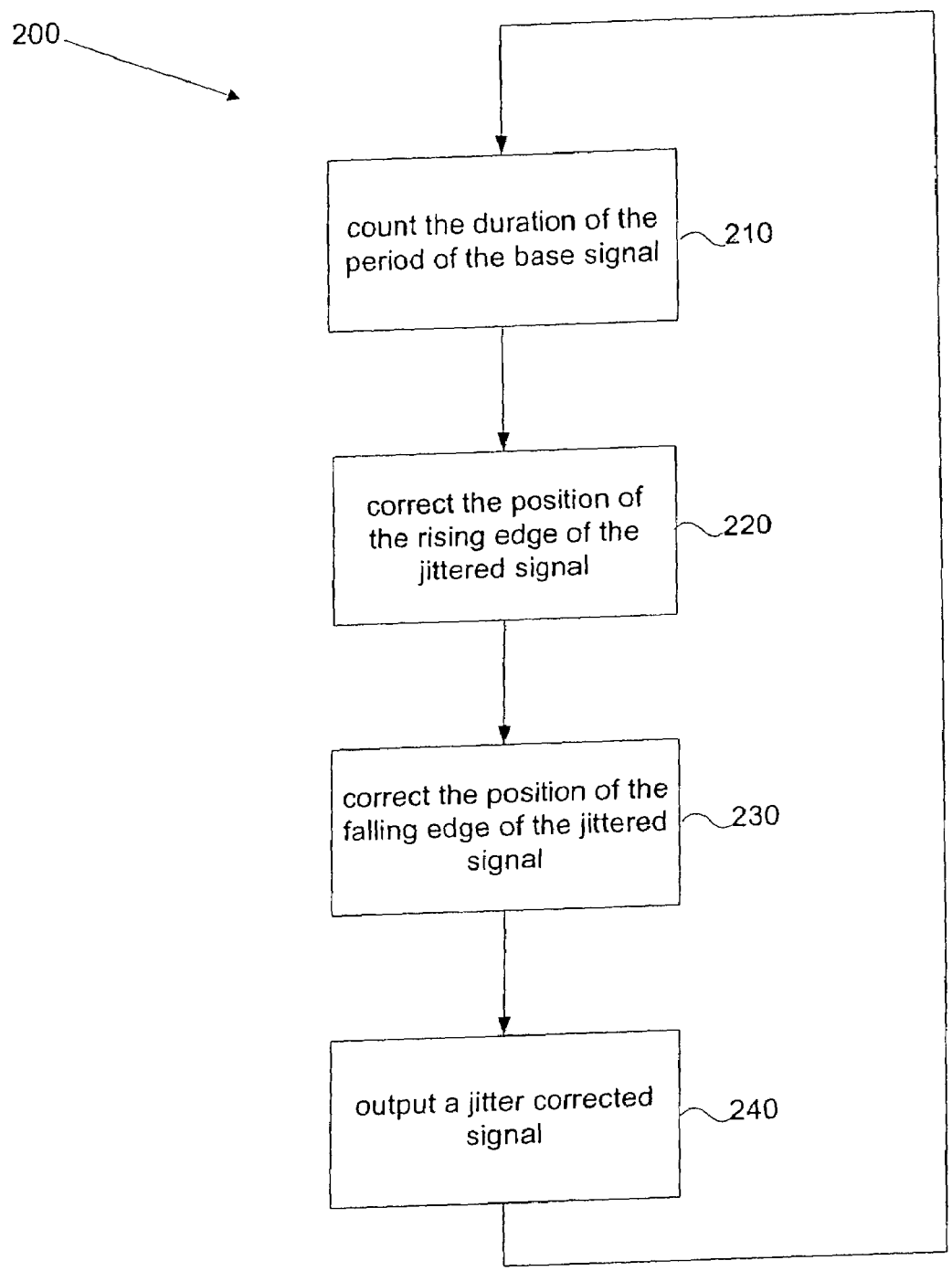
FIG. 2 shows a flow diagram of an embodiment of a jitter correction process.

An embodiment of a jitter correction process that may be implemented by duration of each apparatus 100 is described with respect to FIG. 2. Referring to process 200 of FIG. 2, the period of a base signal is counted, 210. In one embodiment, the duration may be counted by detecting the start of any active state of the base signal, resetting the count to zero, updating the count every clock cycle during the active state and inactive state of the base signal, and requesting this process when another active state is detected. In one embodiment, action 210 may be performed using the process described with respect to FIG. 4. The position of the rising edge of the jittered signal is corrected to provide a jitter corrected rising edge, 220. In one embodiment, the rising edge of the jittered signal is corrected by modifying, adjusting, or using any other type of processing on the rising edge of the signal to reduce the amount of jitter. In one embodiment, action 220 may be performed using the process described with respect to FIG. 5. The position of the falling edge of the jittered signal is corrected to provide a jitter corrected falling edge signal, 230. In one embodiment, the falling edge of the jittered signal is corrected by modifying, adjusting, or using any other type of processing on the falling edge of the signal to reduce the amount of jitter. In one embodiment, action 230 may be performed using the process described with respect to FIG. 6. A jitter corrected signal is output, 240. In one embodiment, the jitter corrected rising edge and the jitter corrected falling edge may be combined and output as the jitter corrected signal.

Figure 3:
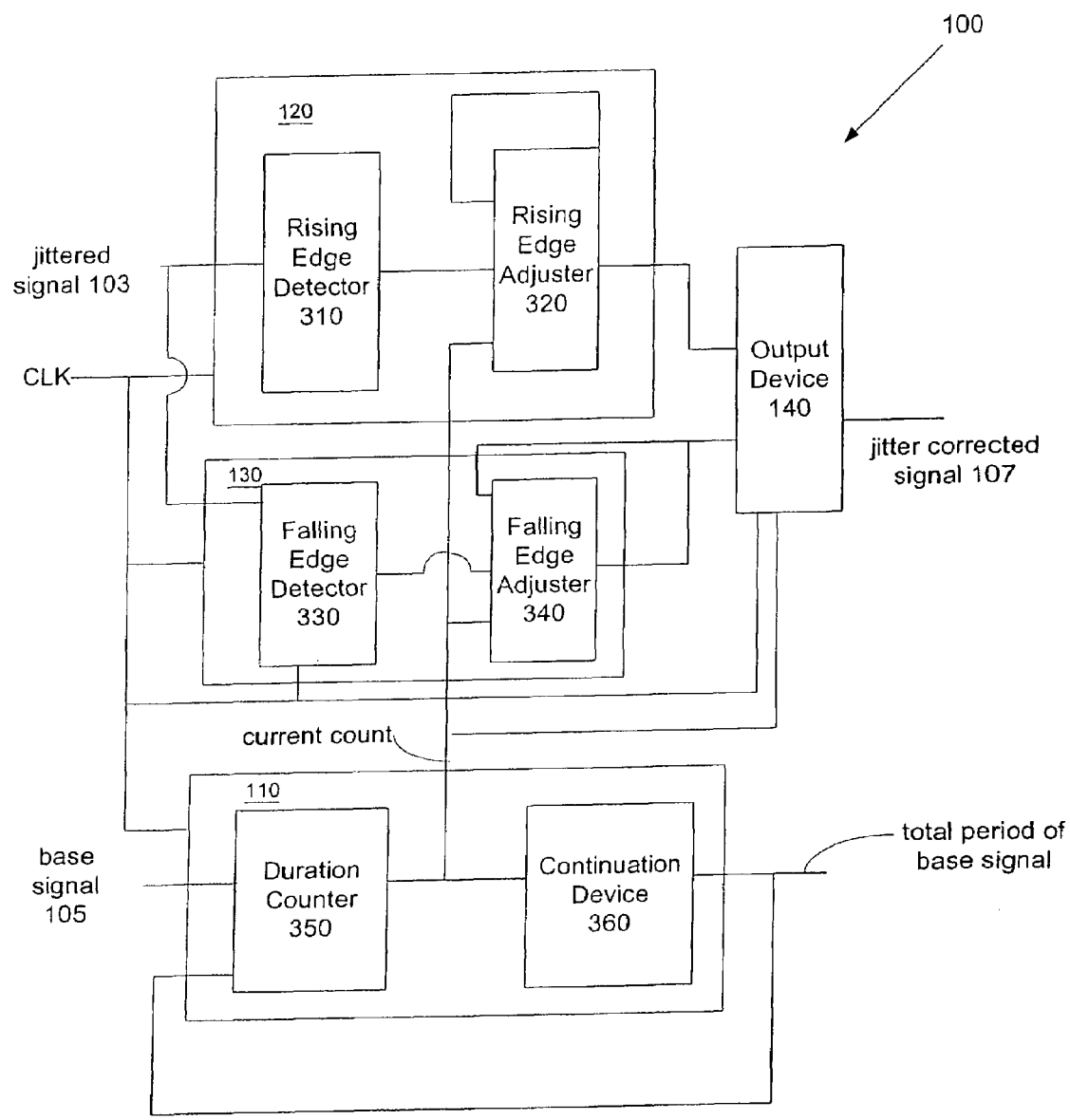
FIG. 3 shows a block diagram of another embodiment of a jitter correction apparatus.

Referring to FIG. 1, apparatus 100 includes a counter 110, rising edge corrector 120, falling edge corrector 130, and jitter corrected signal output device 140. Another embodiment of a jitter correction apparatus is shown in FIG. 3. In the embodiment shown in FIG. 3, rising edge corrector 120 includes jittered signal rising edge detector 310 and jittered signal rising edge adjuster 320. Falling edge corrector 130 includes jittered signal falling edge detector 330 and jittered signal falling edge adjuster 340. Counter 110 includes base signal current duration counter 350 and periodic signal continuation device 360. An input clock signal (CLK) may be used to synchronize the operations of apparatus 100. The source of signal CLK may be the same as that of the jittered signal and the base signal. Signal CLK is used as the clock for apparatus 100.

Jittered signal rising edge detector 310 and jittered signal falling edge detector 330 have inputs to receive the jittered signal and the clock signal. The jittered signal rising edge detector 310 detects the rising edge of the jittered signal and outputs the detection of the rising edge to the jittered signal rising edge adjuster 320. Similarly, jittered signal falling edge detector 330 detects the falling edge of the jittered signal and outputs the detection of the falling edge to jittered signal falling edge adjuster 340.

Base signal current duration counter 350 has inputs to receive base signal 105 and the clock signal. Base signal current duration counter 350 may monitor the state of the base signal to determine when the base signal is active (e.g., when the base signal indicates data is being transmitted on the image signal 103). In this embodiment, the base signal is active when it is a binary zero value. Base signal current duration counter 350 counts the duration of each period of the base signal and outputs the count to each of jittered signal rising edge adjuster 320, jittered signal falling edge adjuster 340, jitter corrected signal output device 140, and periodic signal continuation device 360. In one embodiment, base signal current duration counter 350 resets its count at the beginning of each new active state of base signal. In one embodiment, base signal current duration counter 350 continues to output the count after base signal becomes inactive. The count may restart from zero after reaching a maximum, or total, periodic count. The maximum periodic count can be programmed by periodic signal continuation device 360.

Jittered signal rising edge adjuster 320 has inputs to receive (1) the count from base signal current duration counter 350 and (2) the detection of a rising edge of the jittered signal from jittered signal rising edge detector 310. Jittered signal rising edge adjuster 320 outputs a jitter corrected position value of the rising edge of the jittered signal, which may be determined in accordance with the process described with respect to FIG. 5 below, for example. In one embodiment, the rising edge adjuster 320 determines a rising edge count based on the count from counter 350 and the rising edge detection from detector 310, and uses the rising edge count and detection to output a jitter corrected rising edge of the jittered signal.

Jittered signal falling edge adjuster 340 has inputs to receive (1) the count from base signal current duration counter 350 and (2) the detection of the falling edge of the jittered signal from jittered signal falling edge detector 330. Jittered signal falling edge adjuster 340 outputs a corrected position value of the falling edge of the image signal, which may be determined in accordance with the process described with respect to FIG. 6 below. In one embodiment, the falling edge adjuster 340 determines a falling edge count based on the count from counter 350 and the falling edge detection from detector 330, and uses the falling edge count and detection to output a jitter corrected falling edge of the jittered signal. The edge adjusters 320 and 340 may correct each respective edge of the jittered signal by modifying, adjusting, or using any other type processing that reduces or eliminates jitter in signal 103.

Jitter corrected signal output device 140 has inputs to receive the jitter corrected position values of the rising and falling edges from respective jittered signal rising edge adjuster 320 and jittered signal falling edge adjuster 340. Jitter corrected signal output device 140 may combine the jitter corrected rising edge and the jitter corrected falling edge to output a jitter corrected signal. In one embodiment, device 140 outputs the respective jitter corrected rising and falling edges to form jitter corrected signal 107 when the position value of each of the jitter corrected rising and falling edges match the current count generated by base signal current duration counter 350.

Periodic signal continuation device 360 provides the total periodic count of base signal to current duration counter 350. During vertical blanking, i.e., when the base signal is an inactive state and corresponding video data is not being transmitted on the image signal, counter 350 continues to count. To avoid counting beyond defined limits, the periodic signal continuation device 360 is used to program the total periodic count to counter 350 so that counter 350 resets its current count after the count reaches the total periodic count. Thus, during vertical blanking, jitter corrected signal output device 140 continues to output the jitter corrected signal.

Figure 4:
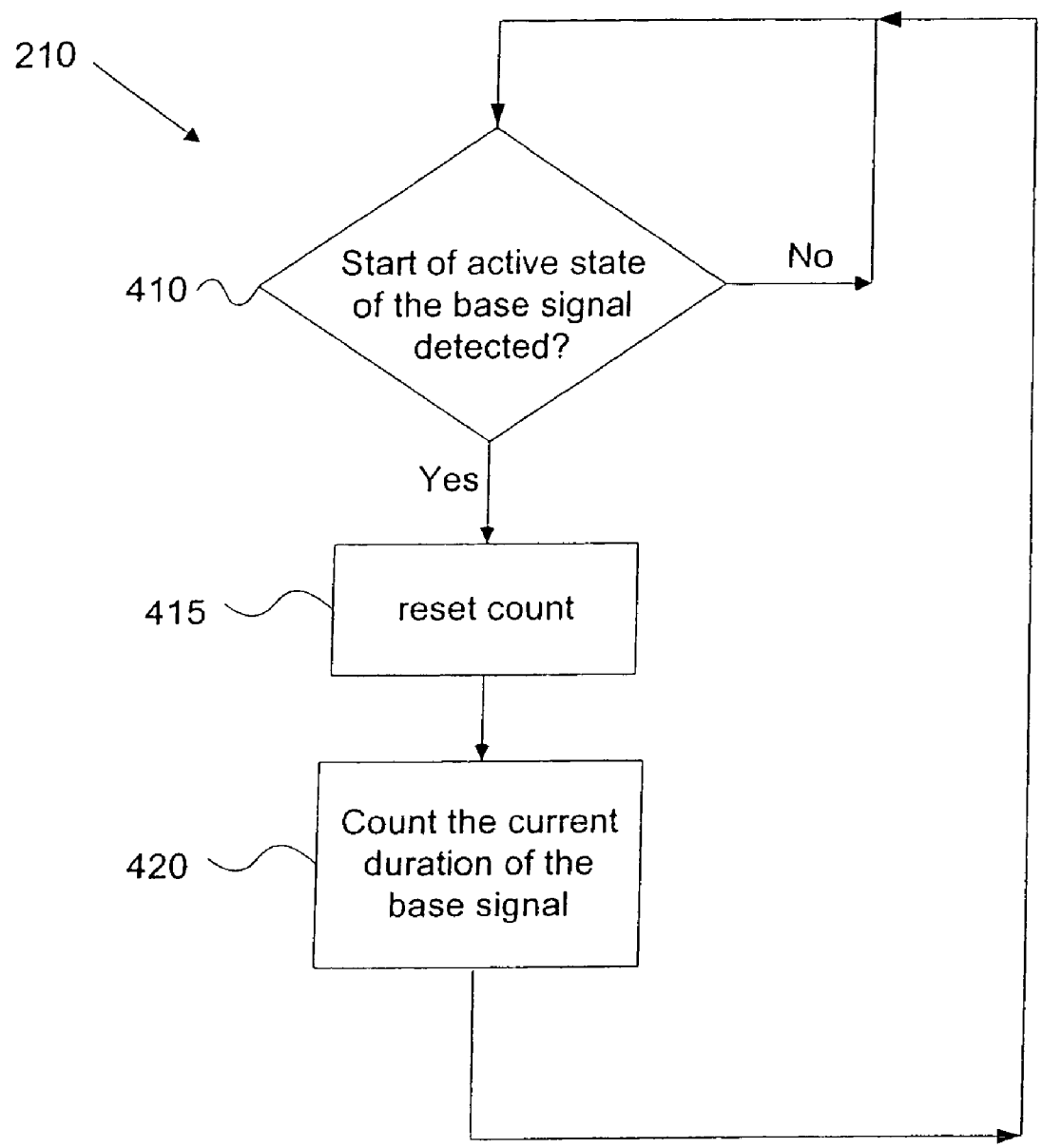
FIG. 4 shows a flow diagram of an embodiment of a counting process which may be used in jitter correction.

FIG. 4 shows a flow diagram of one embodiment of a process which may be used to perform action 210 of process 200. In action 410 of FIG. 4, the action determines whether the start of the active state of the base signal is detected. In one embodiment, the base signal is in an active state when it is in a binary zero state. If the base signal is active, action 415 follows, but otherwise action 410 repeats. The count is reset, 415. In action 420, the duration of the active state is counted. The count is output to jittered signal rising edge adjuster 320, jittered signal falling edge adjuster 340 and jitter corrected signal output device 140. In one embodiment, the count of the duration may reset on the start of the active state of the base signal or when the duration reaches the total periodic count set by periodic signal continuation device 360.

Figure 5:
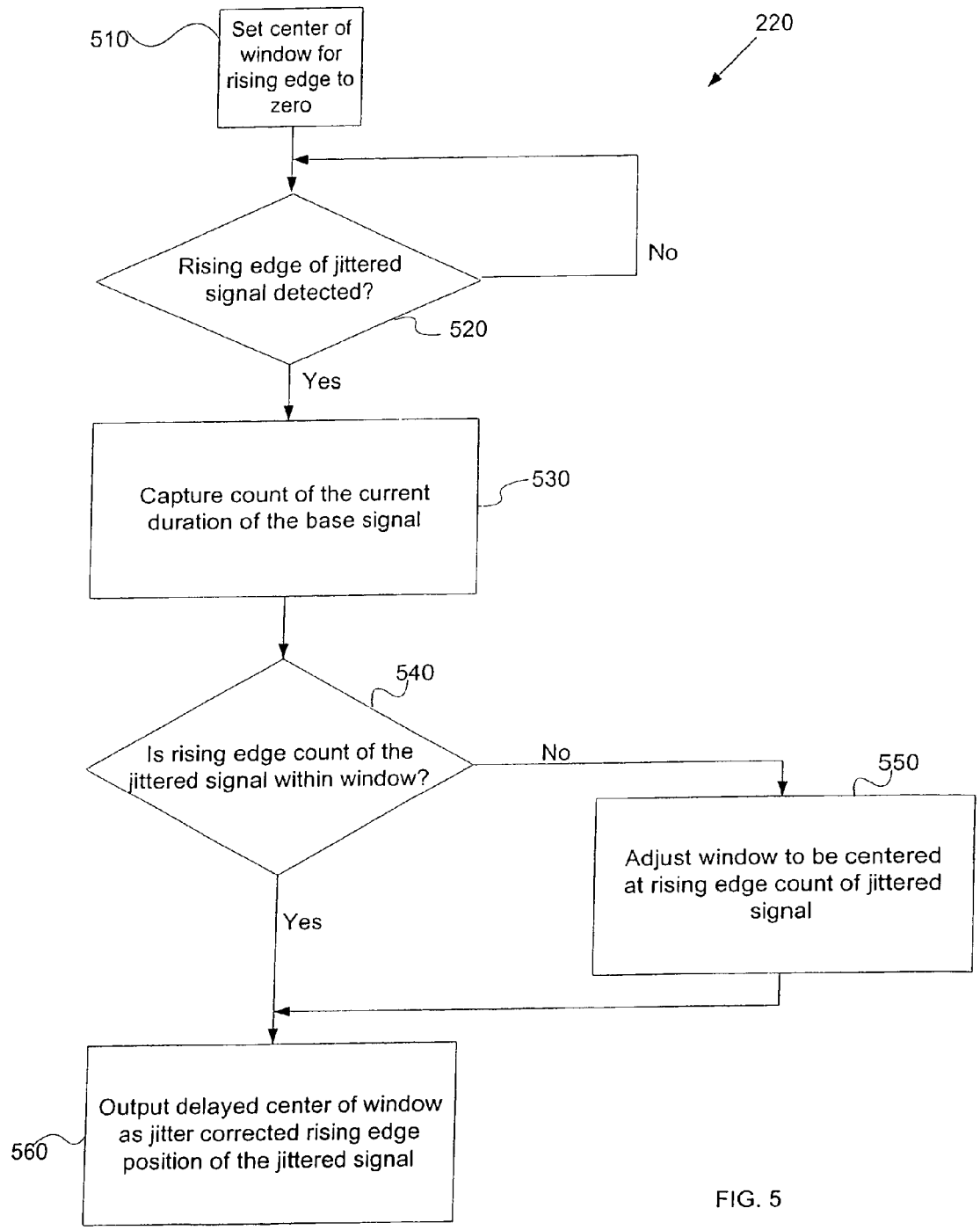
FIG. 5 shows a flow diagram of a rising edge adjusting process which may be used in jitter correction.

FIG. 5 shows a flow diagram of an embodiment of a process which may be used to perform action 220 of process 200 to correct the position of the rising edge of jittered signal. In action 510, the variable representing the center of the window of the rising edge of jittered signal is initialized to a value such as zero for example. The center of the window is represented by a duration of the count value. The rising edge of jittered signal is detected, 520. Action 520 may be repeated until jittered signal rising edge detector 310 detects the rising edge of the jittered signal. In action 530, the count of the duration upon detection of the rising edge is captured, 530. In action 540, the process determines whether the count of the rising edge of the jittered signal is within the programmed window. If so action 560 follows, otherwise action 550 follows.

In action 550, the programmed window is adjusted to be centered at the count of the rising edge of the jittered signal. In one embodiment, the window is four (4) increments of the current count value in duration although its duration can be varied. One factor that may be used to determine the duration of the window can be the amount of signal transition offset caused by jitter so that the jitter skewed rising and falling edge transitions occur within the window. Another factor that may be used is that if window width is too large, then rising and falling transitions of the jittered signal can be modified by too large an amount, which could cause undesirable video signal distortion. In action 560, a delay to the center count of the programmed window is added to the rising edge. The center count is output as the jitter corrected position value of the rising edge of the jittered signal. In one embodiment, the delay may be three cycles of the duration value of base signal current position counter 350, for example.

Figure 6:
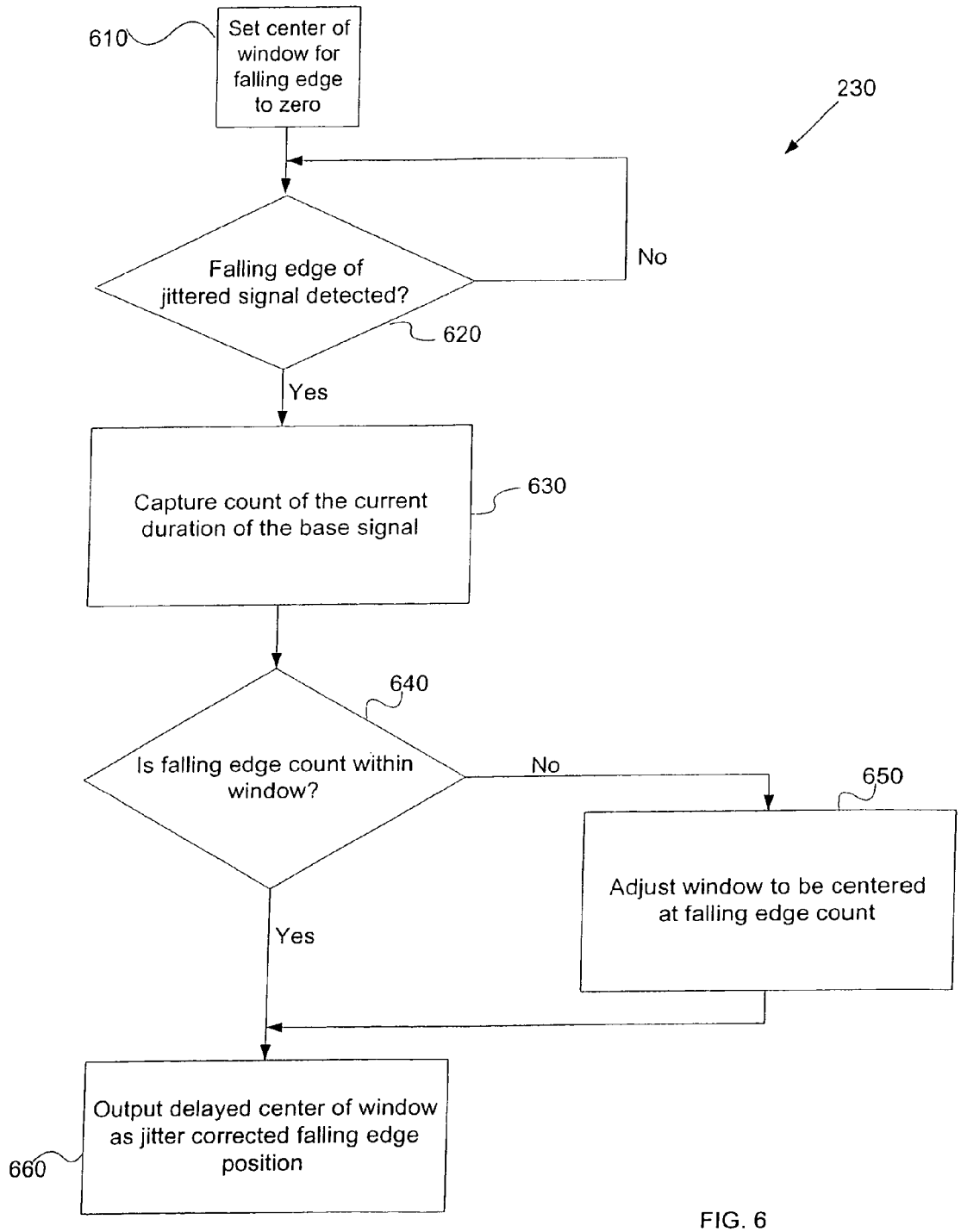
FIG. 6 shows a flow diagram of an embodiment of a falling edge adjusting process which may be used in jitter correction.

FIG. 6 shows a flow diagram of an embodiment of a process that may be used to perform action 230 of process 200, to correct the falling edge of the jittered image signal. In action 610 of FIG. 6, the variable representing the center of the window for the falling edge of the jittered signal is initialized to a value such as zero, for example. In action 620, the process determines whether the falling edge of the jittered signal is detected. The center of the window is represented by a position of the current count value. In action 630, the count is captured from base signal current duration counter 350 when the occurrence of the falling edge is detected. In action 640, whether the count of the falling edge of jittered signal is within the programmed window is determined. If so action 660 follows, otherwise action 650 follows.

In action 650, the programmed window is adjusted to be centered at the count of the falling edge of the jittered signal. In one embodiment, the window is four (4) increments of the current count value in duration although the duration can be varied. The length of the window for the falling edge can be determined in a similar manner as that for the rising edge. In action 660, the jittered signal falling edge adjuster 340 adds a delay to the center count of its programmed window and outputs the center count as the jitter corrected position of the falling edge of the image signal. In one embodiment, the delay may be three cycles of the current count signal of base signal current position counter 350 for example.

Figure 7:
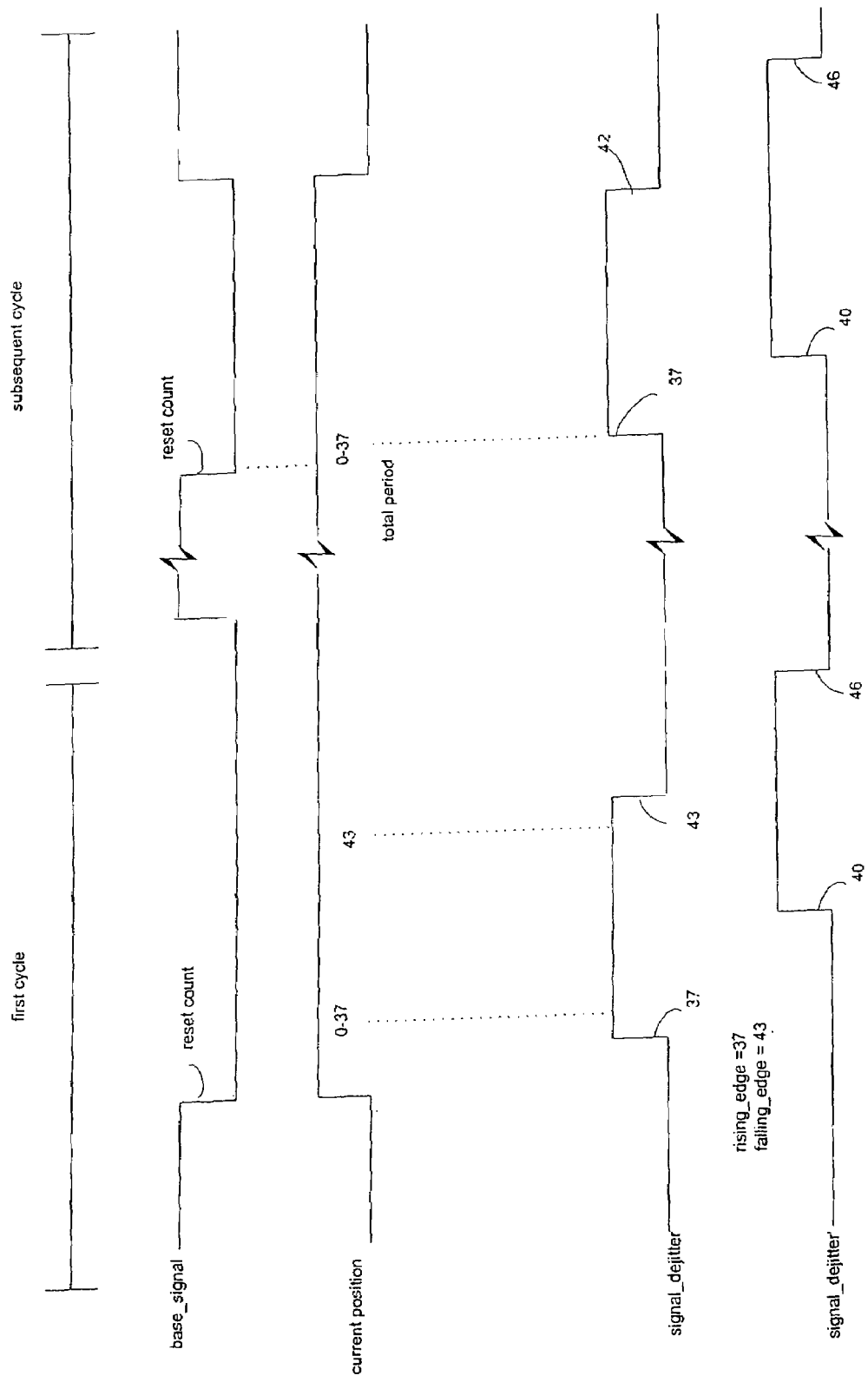
FIG. 7 shows examples of waveforms which may be used in jitter correction.

FIG. 7 shows examples of waveforms that may be used by the jitter correction apparatus of FIG. 3. The base signal current duration counter 350 counts the duration of the base signal, which in this example is a low state, beginning at zero as shown. The count of the base signal current duration counter may be represented by the signal "current count". In a first cycle, the rising and falling edges of the jittered signal during counts 37 and 43. The jittered signal rising edge detector 310 informs the jittered signal rising edge adjuster 320 of a rising edge that occurs at count 37. The jittered signal falling edge detector 330 informs the jittered signal falling edge adjuster 340 of a rising edge that occurs at count 43. Thus, the rising edge of the jittered signal occurs at count 37 and the falling edge of the jittered signal occurs at count 43. In this example, as the first rising edge of the jittered signal occurs at count 37, the center of the programmed window of the jittered signal rising edge adjuster is set to the first rising edge of the jittered signal. Similarly, the center of the programmed window of the jittered signal falling edge adjuster is set to the first falling edge of the jittered signal, i.e., count 43.

In the example of FIG. 7, the jittered signal rising edge adjuster 320 outputs the delayed center of its programmed window to the jitter corrected signal output device 140 as the jitter corrected rising edge position of the image signal at count 40. Similarly, the jittered signal falling edge adjuster 340 outputs the delayed center of its programmed window to the jitter corrected signal output device 140 as the jitter corrected falling edge position of jittered signal at count 46. Jitter corrected signal output device 140 receives the jitter corrected rising and falling edge positions and outputs a jitter corrected signal as discussed above.

In a subsequent cycle of this example, the base signal current duration counter 350 counts the duration of the period of the base signal, as in the first cycle discussed above, and outputs the count of the duration. In the subsequent cycle, the jittered signal is active from count 37 to count 42. Thus, the rising edge of the jittered signal occurs at count 37 and the falling edge of the jittered signal occurs at count 42. The rising and falling edges of the jittered signal are within the programmed windows for respective rising and falling edges as stored by respective jittered signal rising edge adjuster 320 and jittered signal falling edge adjuster 340. The rising edge of the jittered signal is at count 37 and within the programmed window of the jittered signal rising edge adjuster 320 that was set earlier at count 37. The jittered signal rising edge adjuster outputs the rising edge position of the jittered signal as count 37. At count 42, the jittered signal falling edge is within the programmed window of jittered signal falling edge adjuster 340 previously set at count 43. The jittered signal falling edge adjuster 340 outputs the falling edge position of the jittered signal as count 43, which corresponds to the center of its programmed window. Jittered signal rising edge adjuster 320 and jittered signal falling edge adjuster 340 each output the count of respective delayed and jitter corrected rising and falling edges of the image signal having respective counts 40 and 46 to jitter corrected signal output device 140. Jitter corrected signal output device 140 outputs the jitter corrected signal as discussed above.

The jitter corrected signal that is output by apparatus 100 may include a delay. The delay may be introduced because jitter corrected signal output device 140 receives the count positions of the jitter corrected rising and falling edge positions after the corresponding count positions of the current count from base signal current position counter 350. The delay may also be introduced by the processing time of the elements of the jitter correction apparatus 100.

In one embodiment, apparatus 100 of FIG. 3 may be modified to eliminate the delay in the transitions of rising and falling edges of the jitter corrected signal introduced by respective jittered signal rising edge adjuster 320 and jittered signal falling edge adjuster 340. In this embodiment, jitter corrected signal output device 140 repeatedly outputs the jitter corrected signal at the jitter corrected rising and falling edge positions programmed by jittered signal rising edge adjuster 320 and jittered signal falling edge adjuster 340. The embodiment without delay eliminates delay in generating a jitter corrected signal. Eliminating the delay may be desired because the delay may cause a subtle shift in image position from that which was intended.

Figure 8:
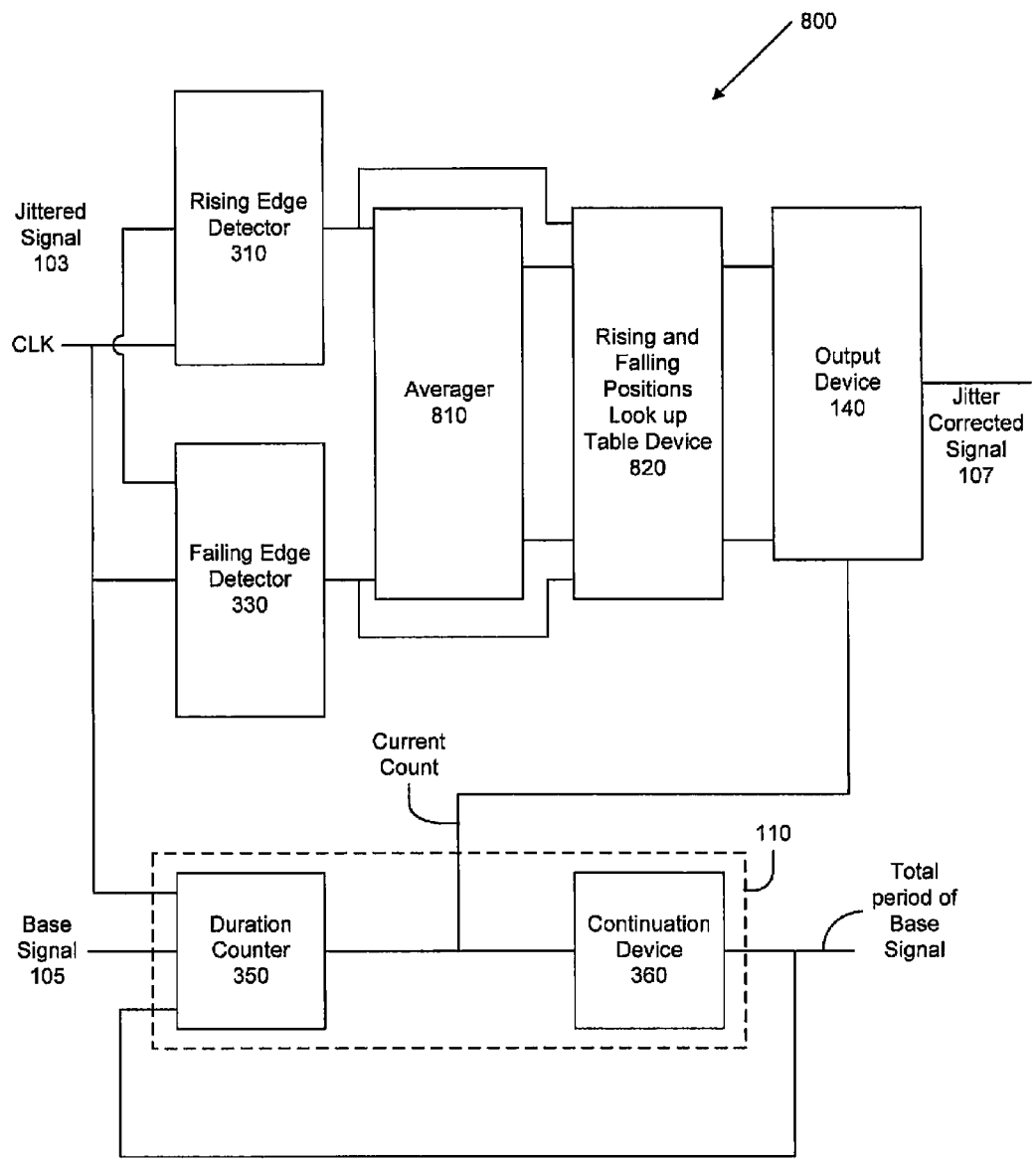
FIG. 8 shows a block diagram of another embodiment of a jitter correction apparatus.

One embodiment of jitter correction includes techniques to generate a jitter corrected, or dejittered, signal, from a jittered video, or jittered image, signal, for example. This embodiment reduces delay in generating the jitter corrected signal. An example of this embodiment is shown in FIG. 8 as apparatus 800. Apparatus 800 includes jittered signal rising edge detector 310, jittered signal falling edge detector 330, averager 810, rising and falling edge look-up-table (LUT) 820, base signal current duration counter 350, periodic signal continuation device 360, and jitter corrected signal output device 140.

Figure 12:
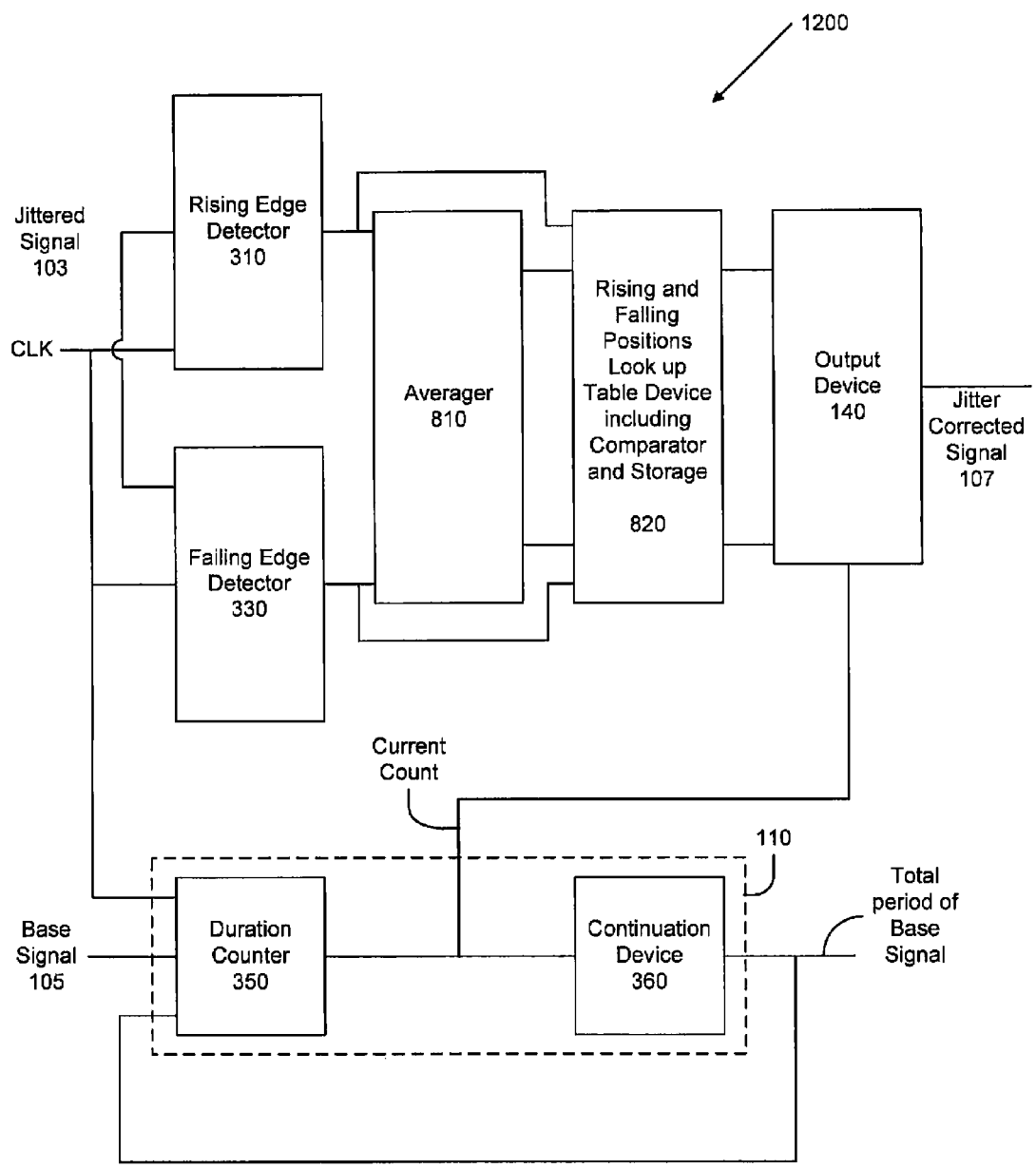
FIG. 12 shows a block diagram of another embodiment of a jitter correction apparatus in which the Rising and Falling Positions Look Up Table. (LUT) 820 includes comparator and storage that stores rising and falling positions and compares detected rising and falling average positions of the jittered signal with the stored rising and falling edge positions.

Averager 810 has inputs to receive the rising and falling edge positions of jittered signal from respective jittered signal rising edge detector 310 and jittered signal falling edge detector 330. Averager 810 averages the detected rising and falling edge positions and outputs these averaged positions to LUT 820. LUT 820 is coupled to receive the detected rising and falling edge positions of jittered signal from respective jittered signal rising edge detector 310 and jittered signal falling edge detector 330 and has inputs to receive the average rising and falling edge positions from averager 810. LUT 820 may store rising and falling positions, such as industry standard rising and falling positions for example. LUT 820 compares the detected rising and falling average positions of the jittered signal with the respective stored rising and falling edge positions. FIG. 12 shows a block diagram of an embodiment of a jitter correction apparatus 1200 in which the rising and falling positions Look Up Table (LUT) 820 specifically includes a comparator and storage that stores rising and falling positions and compares detected rising and falling average positions of the jittered signal with the stored rising and falling edge positions. If the detected rising and falling edges are each within a programmed range of the respective stored rising and falling edge positions, then the LUT 820 outputs the stored rising and falling edge positions as the jitter corrected rising and falling positions to jitter corrected signal output device 140. The programmed range may be determined in a similar manner as the window width with respect to the jittered signal rising edge adjuster 320. Otherwise, the LUT 820 outputs the detected rising and falling edge positions from jittered signal as jitter corrected rising and falling edges to jitter corrected signal output device 140. Jitter corrected signal output device 140 receives the jitter corrected rising and falling edges and outputs a jitter corrected signal as discussed above. Apparatus 800 may be implemented by software stored on a computer readable medium and executed by a computer processing system or microprocessor. The apparatus may also be implemented in firmware or hardware, or a combination of software and hardware.

Figure 9:
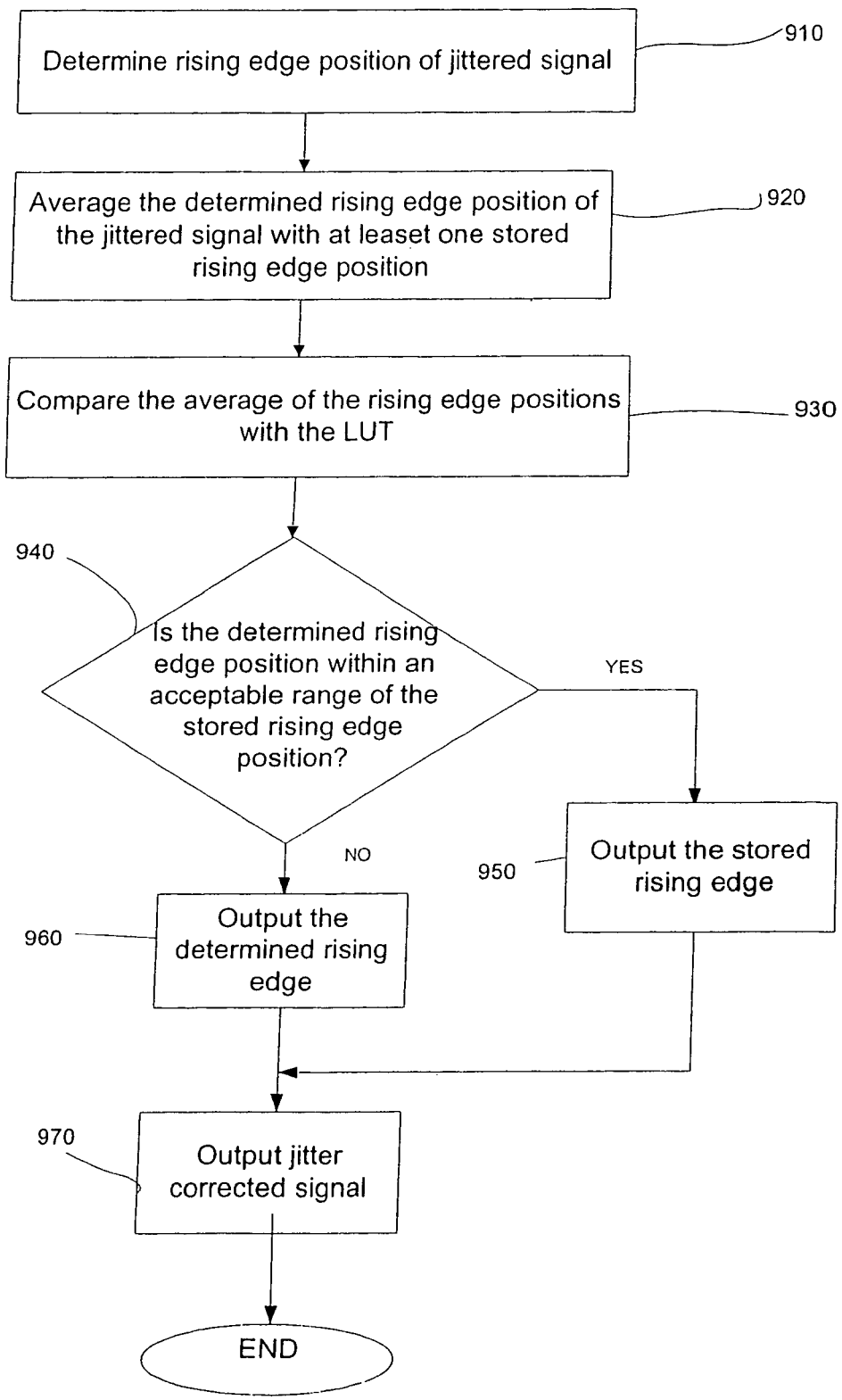
FIG. 9 shows a flow diagram of an embodiment of a rising edge correction process which may be used in jitter correction.
Figure 10:
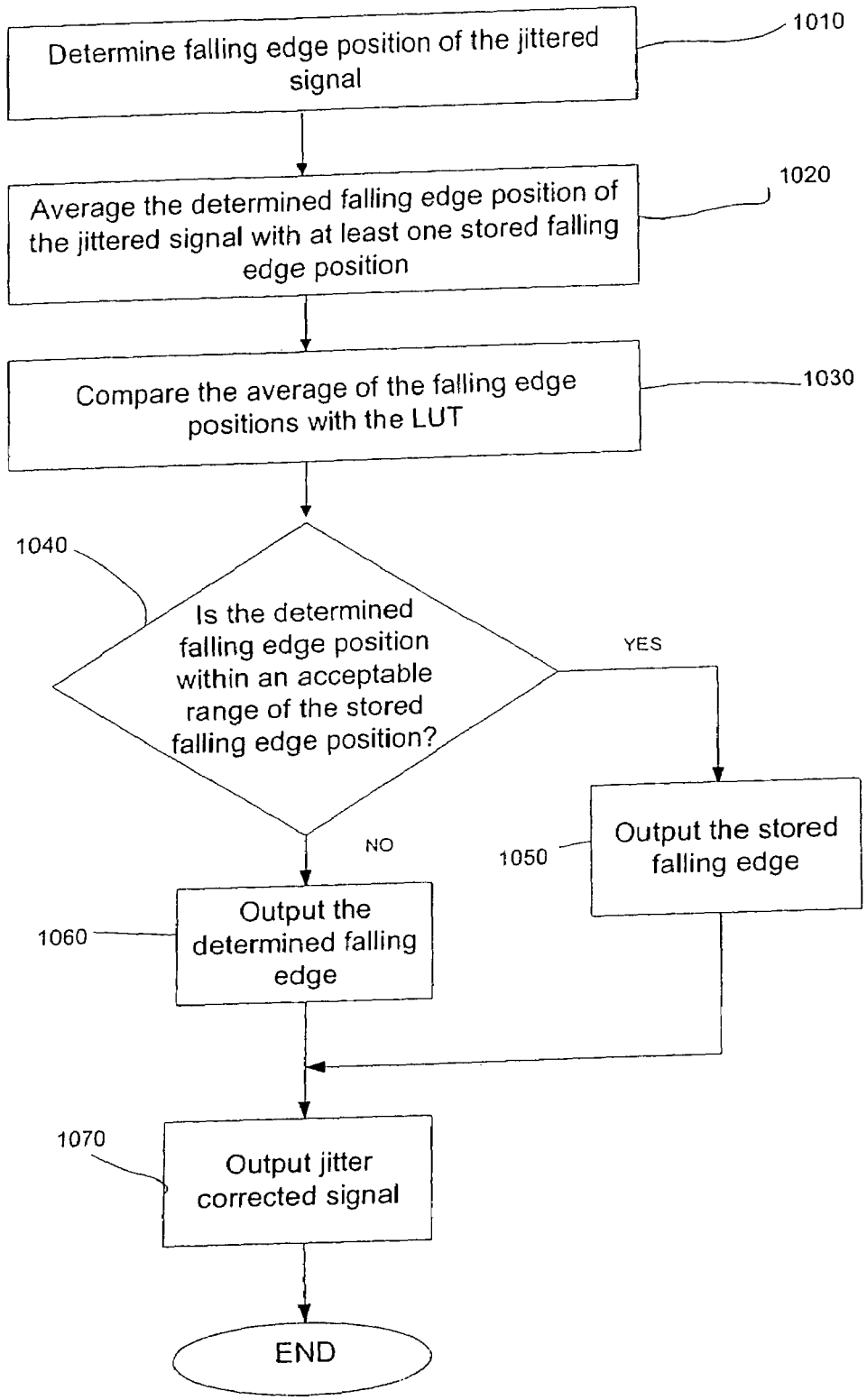
FIG. 10 shows a flow diagram of an embodiment of a falling edge correction process which may be used in jitter correction.

FIGS. 9 and 10 set forth flow diagrams of embodiments of processes that may be used to correct the respective rising and falling edge positions of the jittered signal. In one embodiment, the processes may be performed by apparatus 800. Referring to FIG. 9, in action 910, the rising edge position of the jittered signal is determined. In action 920, the rising edge position of the jittered signal is averaged with one or more stored rising edge positions. In action 930, the average of the rising edge positions is stored in a LUT. In action 940, the determined rising edge position of the jittered signal is compared with the average rising edge position stored in LUT. If the difference between the determined rising edge position and average rising edge position is within a programmed acceptable margin, as discussed above, then action 950 follows, otherwise action 960 follows. In action 950, the average rising edge position is output to jitter corrected signal output device 140 as a jitter corrected rising edge. In action 960, the LUT outputs the determined rising edge position of the jittered signal to jitter corrected signal output device 140 as a jitter corrected rising edge. In action 970, jitter corrected signal output device 140 receives the jitter corrected rising edge of the jitter corrected signal, combines this signal with a jitter corrected falling edge signal, and outputs a jitter corrected signal.

Referring to FIG. 10, in action 1010, the falling edge position of the jittered signal is determined. In action 1020, the falling edge position of the jittered signal is averaged with one or more stored falling edge positions. In action 1030, the average of the falling edge positions is stored in a LUT. In action 1040, the determined falling edge position of the jittered signal is compared with the average falling edge position stored in LUT. If the difference between the determined falling edge position and the average falling edge position is within a programmed acceptable margin, as discussed above, then action 1050 follows, otherwise action 1060 follows. In action 1050, the average falling edge position is output to jitter corrected signal output device 140 as a jitter corrected falling edge. In action 1060, the LUT outputs the determined falling edge position of the jittered signal to jitter corrected signal output device 140 as a jitter corrected falling edge. In action 1070, jitter corrected signal output device 140 receives the jitter corrected falling edge of the jitter corrected signal and outputs a jitter corrected signal.

Figure 11:
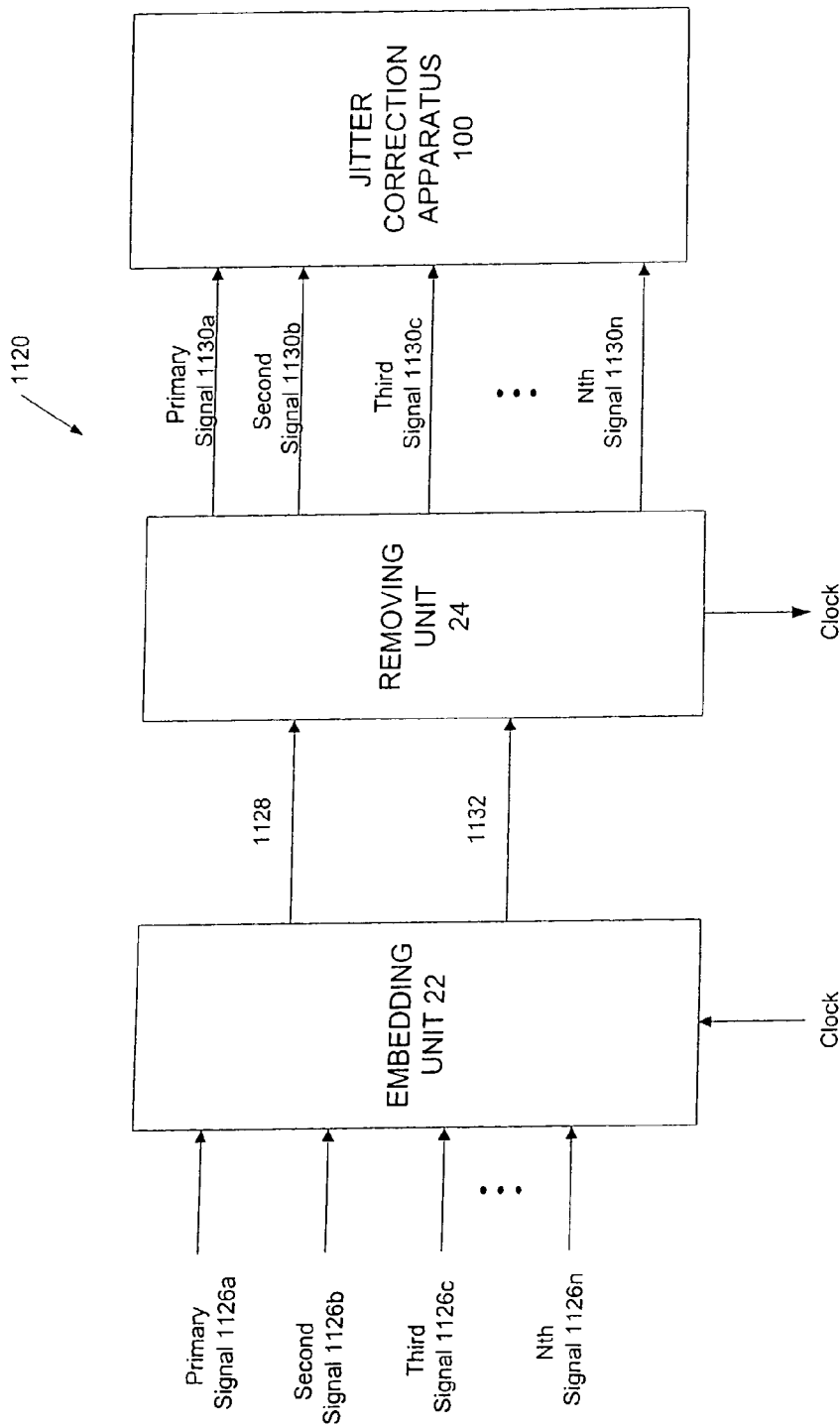
FIG. 11 is a block diagram of an of a system for sending and receiving multiple data streams over a serial link that uses jitter correction.

FIG. 11 shows an embodiment of a transition minimized differential signaling (TMDS) serial link system that uses jitter correction. Referring now to FIG. 11, a block diagram of an embodiment of a serial link system 1120 for sending an isochronous digital data stream and one or more additional digital data streams over a single serial line is shown. The serial link system 1120 includes an embedding unit 1122, a removing unit 1124, a single serial line 1128 and a clock signal line 1132. This system basically is a time multiplexed data transfer in a serial digital interface, for example a display interface. In a conventional parallel digital display interface, there are parallel video data refresh signals for each color (Red, Green, Blue) and video control signals (HSYNC, VSYNC, DE). However, in the system of FIG. 11, multiple content of data streams as well as all video control signals, such as HSYNC, VSYNC, DE, are also sent through display data channels by employing line coding.

The embedding unit 1122 may have a plurality of inputs and a first and second outputs. Each of the plurality of inputs is coupled to a respective input signal line 1126*a*, 1126*b*, 1126*c*, 1126*n* to receive a primary signal, such as a video signal, a second signal, a third signal and a nth signal. Each of the inputs and corresponding input signal lines 1126*a*, 1126*b*, 1126*c*, 1126*n* may be a plurality of signal lines. For example, the primary signal line may be a video signal that has 8 signal lines for data (8 bits of Red, 8 bits of Green, 8 bits of Blue in sequence) and signal lines for a control signals (horizontal sync, vertical sync and other control signals); and the second signal may be an eight bit data signal requiring eight signal lines. The embedding unit 1122 receives the primary signal, second signal, third signal and nth signal, and encodes each signal. Then the embedding unit 1122 combines the encoded signals and inserts separation signals or characters for identifying the input signal from which the encoded signals were derived. The combination results in an encoded serial sequence that is output on the first output for transmission over the serial line 1128. The second output 1132 of the embedding unit 1122 provides a clock signal used to synchronize the transmission of the encoded sequence.

The removing unit 1124 has a first input, a second input and a plurality of outputs. The first input of the removing unit 1124 is coupled to serial line 1128 to receive the encoded serial sequence from the embedding unit 1122. The second input of the removing unit 1124 is coupled to clock line 1132 to receive the clock signal from the embedding unit 1122. The removing unit 1124 separates the encoded serial sequence into separate signals, removes the separation characters and decodes the separate signals which are each output on a respective output of the removing unit 1124. Each of the outputs of the removing unit 1124 is coupled to a signal line 1130*a*, 1130*b*, 1130*c*, 1130*n* to output the deserialized primary signal, second signal, third signal and nth signal, respectively, which were previously serialized. Like the input signal lines 1126*a*, 1126*b*, 1126*c*, 1126*n*, each of the output signal lines 1130*a*, 1130*b*, 1130*c*, 1130*n* may be a plurality of signal lines. For example, the output signal lines 1130*a* may be 25 parallel lines, the other output signal lines might be eight parallel lines. The present invention advantageously makes the embedding, transmission over the serial line 1128 and clock line 1132, and decoding appear completely transparent such that the signals applied to lines 1126*a*-*n* are identical in content and relative timing to the signals that appear on the output lines 1130*a*-1130*n*.

The deserialized signals on lines 1130*a*-1130*n* may contain jitter as a result of being serialized then deserialized. To reduce this jitter, each signal having jitter may be received by jitter correction system 100, which processes each jittered signal to reduce the amount of jitter in the signal as discussed above.

These and other embodiments of jitter correction may be realized in accordance with the teachings described herein and it should be evident that various modifications and changes may be made in the teachings without departing from the broader spirit and scope of the invention. The specification and drawings are, accordingly, to be regarded in an illustrative rather than restrictive sense and the invention measured only in terms of the claims.

We claim:

1. An apparatus comprising:
   a rising edge corrector to receive a jittered signal and to output a jitter corrected rising edge of the jittered signal;
   a falling edge corrector to receive the jittered signal and to output a jitter corrected falling edge of the jittered signal;
   an output device to receive the jitter corrected rising edge, to receive the jitter corrected falling edge, and to output a jitter corrected signal;
   a counter to receive a base signal and to output a count from the base signal; and
   wherein the count is used to correct the rising edge and the falling edge to output the jitter corrected rising edge of the jittered signal and the jitter corrected falling edge of the jittered signal.

2. The apparatus of claim 1 wherein the rising edge corrector further comprises a rising edge detector to receive the jittered signal and to detect a rising edge of the jittered signal; and wherein the falling edge corrector further comprises a falling edge detector to receive the jittered signal and to detect a falling edge of the jittered signal.

3. The apparatus of claim 1 wherein the rising edge corrector further comprises a rising edge adjuster to receive the jittered signal and to adjust a rising edge of the jittered signal; and wherein the falling edge corrector further comprises a falling edge adjuster to receive the jittered signal and to adjust a falling edge of the jittered signal.

4. The apparatus of claim 1 further comprising a counter to receive a base signal and to output a count of the base signal.

5. The apparatus of claim 1, wherein the jittered signal further comprises a video signal.

6. The apparatus of claim 1, wherein the jittered signal further comprises a deserialized signal derived from a serialized signal.

7. An apparatus comprising:
   a rising edge corrector to receive a jittered signal and to output a jitter corrected rising edge of the jittered signal;
   a falling edge corrector to receive the jittered signal and to output a jitter corrected falling edge of the jittered signal;
   an output device to receive the jitter corrected rising edge, to receive the jitter corrected falling edge, and to output a jitter corrected signal; and
   a counter to receive a base signal and to output a count of the base signal;
   wherein the rising edge corrector is configured to correct a rising edge of the jittered signal using the count received from the counter; and
   wherein the falling edge corrector is configured to correct a falling edge of the jittered signal using the count received from the counter.

8. An apparatus comprising:
   rising edge correction means for receiving a jittered signal and for outputting a jitter corrected rising edge of the jittered signal;
   falling edge correction means for receiving the jittered signal and for outputting a jitter corrected falling edge of the jittered signal;
   jitter corrected output means for receiving the jitter corrected rising edge, for receiving the jitter corrected falling edge, and for outputting a jitter corrected signal;
   counter means for receiving a base signal and for outputting a count from the base signal; and
   the rising edge correction means is configured to correct a rising edge of the jittered signal using the count received from said counting means.

9. The apparatus of claim 8 wherein said rising edge correction means further comprises rising edge detection means for receiving the jittered signal and for detecting a rising edge of the jittered signal.

10. The apparatus of claim 8 wherein said rising edge correction means further comprises rising edge adjuster means for receiving the jittered signal and for adjusting a rising edge of the jittered signal.

11. A method comprising:
    receiving a jittered signal;
    correcting a rising edge of the jittered signal;
    correcting a falling edge of the jittered signal;

outputting a jitter corrected signal using the corrected rising edge and the corrected falling edge;
determining a count of a current duration of a base signal; and
correcting the rising edge further comprises using the count to correct the rising edge.

12. The method of claim 11 wherein correcting a rising edge further comprises detecting a rising edge of the jittered signal.

13. The method of claim 11 wherein correcting a rising edge further comprises adjusting a rising edge of the jittered signal.

14. A computer readable medium having instructions embodied thereon, which, when executed by a processing system, cause the system to perform a method comprising:
receiving a jittered signal;
correcting a rising edge of the jittered signal;
correcting a falling edge of the jittered signal;
outputting a jitter corrected signal using the corrected rising edge and the corrected falling edge;
correcting by determining a count of a base signal; and
correcting by using the count to correct the rising edge or the falling edge or both the rising edge and the falling edge.

15. The medium of claim 14 wherein the instructions, when executed, cause the system to perform correcting by detecting a rising edge of the jittered signal.

16. The medium of claim 14 wherein the instructions, when executed, cause the system to perform correcting by adjusting a rising edge of the jittered signal.

17. An apparatus comprising:
a counter to receive a base signal and to output a count of the base signal;
a rising edge corrector to receive a jittered signal and to output a jitter corrected rising edge of the jittered signal;
a falling edge corrector to receive the jittered signal and to output a jitter corrected falling edge of the jittered signal; and
an output device to receive the jitter corrected rising edge, to receive the jitter corrected falling edge, and to output a jitter corrected signal; wherein the jittered signal further comprises a deserialized signal derived from a serialized signal; and
the rising edge corrector is configured to correct a rising edge of the jittered signal using the count received from the counter; and
the falling edge corrector is configured to correct a falling edge of the jittered signal using the count received from the counter.

18. The apparatus of claim 17 wherein the rising edge corrector further comprises a rising edge detector to receive the jittered signal and to detect a rising edge of the jittered signal; and wherein the falling edge corrector further comprises a falling edge detector to receive the jittered signal and to detect a falling edge of the jittered signal.

19. The apparatus of claim 17 wherein the rising edge corrector further comprises a rising edge adjuster to receive the jittered signal and to adjust a rising edge of the jittered signal; and wherein the falling edge corrector further comprises a falling edge adjuster to receive the jittered signal and to adjust a falling edge of the jittered signal.

20. The apparatus of claim 17, wherein the jittered signal further comprises a video signal.

21. An apparatus comprising:
a signal edge corrector to receive a jittered signal and to output a jitter corrected signal edge of the jittered signal;
a counter to receive a base signal and to output a count determined from the base signal; and
an output device receiving the jitter corrected signal edge and the count and generating a jitter corrected output signal wherein the count is used to correct the signal edge of the jittered signal.

22. The apparatus of claim 21, wherein the jitter corrected signal edge comprises a jitter corrected rising signal edge, and the jitter corrected output signal has a jitter corrected rising signal edge.

23. The apparatus of claim 21, wherein the jitter corrected signal edge comprises a jitter corrected falling signal edge, and the jitter corrected output signal has a jitter corrected falling signal edge.

24. The apparatus of claim 21, wherein:
the jitter corrected signal edge comprises a jitter corrected rising signal edge and a jitter corrected falling signal edge; and
the jitter corrected output signal has a jitter corrected rising signal edge and a jitter corrected falling signal edge.

25. The apparatus of claim 21, wherein:
the signal edge corrector further comprises a signal edge detector to receive the jittered signal and to detect a signal edge of the jittered signal.

26. The apparatus of claim 21, wherein:
the signal edge corrector further comprises a signal edge adjuster to receive the jittered signal and to adjust a signal edge of the jittered signal.

27. The apparatus of claim 21, wherein the signal edge corrector further comprises:
a signal edge detector to receive the jittered signal and to detect the signal edge of the jittered signal; and
a signal edge adjuster to receive the jittered signal and to adjust the signal edge of the jittered signal.

28. The apparatus of claim 27, wherein:
the signal edge detector includes a rising edge signal detector to receive the jittered signal and to detect the signal rising edge of the jittered signal, and a falling edge signal detector to receive the jittered signal and to detect the signal falling edge of the jittered signal;
the signal edge adjuster includes a rising edge signal adjuster to receive the jittered signal and to adjust the rising signal edge of the jittered signal, and a falling edge signal adjuster to receive the jittered signal and to adjust the falling signal edge of the jittered signal; and
the output device receiving the jitter corrected rising signal edge, the jitter corrected falling signal edge, and the count, and generating a jitter corrected output signal wherein the count is used to correct the signal rising edge and signal falling edge of the jittered signal.

29. The apparatus of claim 21, wherein the signal edge corrector further comprises:
a signal edge detector to receive the jittered signal and to detect the signal edge of the jittered signal;
a signal edge averager generating an average detected signal edge position from the detected signal edge positions; and
a comparator, including a storage storing signal edge reference positions in a look-up table, receiving the generated average signal edge position and comparing the detected average signal edge positions to the stored signal edge reference positions, and to generate a jitter corrected edge position output that is: (i) a particular one of the stored signal edge reference positions when the average position is within a predetermined range of the particular stored reference position, and otherwise, that is (ii) the detected signal edge position.

30. The apparatus of claim 29, wherein:
the signal edge detector receives the jittered signal and detects a signal rising edge of the jittered signal and a signal falling edge of the jittered signal;
the signal edge averager generating an average detected signal rising edge position from the detected signal rising edge positions and an average detected signal falling edge position from the detected signal falling edge positions; and
the comparator:
(a) receives the generated average signal rising and falling edge positions and (i) compares the detected average signal rising edge positions to the stored signal rising edge reference positions, and (ii) compares the detected average signal falling edge positions to the stored signal falling edge reference positions; and
(b) generates a jitter corrected rising edge position and falling edge position outputs that are: (i) particular ones of the stored signal rising edge reference positions and signal falling edge positions when the average positions are within predetermined ranges of the particular stored rising edge and falling edge reference positions, and otherwise, that are (ii) the detected signal rising edge position and detected signal falling edge position.

31. A method comprising:
receiving a jittered signal;
correcting a signal edge of the jittered signal;
outputting a jitter corrected signal using the corrected signal edge;
receiving a base signal and generating a count from the base signal; and
generating a jitter corrected output signal from the jitter corrected signal edge and the count, wherein the count is used to correct the signal edge of the jittered signal.

32. The method of claim 31, wherein the jitter corrected signal edge comprises a jitter corrected rising signal edge, and the jitter corrected output signal has a jitter corrected rising signal edge.

33. The method of claim 31, wherein the jitter corrected signal edge comprises a jitter corrected falling signal edge, and the jitter corrected output signal has a jitter corrected falling signal edge.

34. The method of claim 31, wherein:
the jitter corrected signal edge comprises a jitter corrected rising signal edge and a jitter corrected falling signal edge; and
the jitter corrected output signal has a jitter corrected rising signal edge and a jitter corrected falling signal edge.

35. The method of claim 31, wherein:
the correcting of the signal edge further comprises detecting a signal edge of the jittered signal.

36. The method of claim 31, wherein:
the correcting of the signal edge further comprises adjusting a signal edge of the jittered signal.

37. The method of claim 31, wherein the correcting of the signal edge further comprises:
detecting a signal edge of the jittered signal; and
adjusting a signal edge of the jittered signal.

38. The method of claim 37, wherein:
the detecting a signal edge includes detecting a rising signal edge of the jittered signal, and detecting a falling signal of the jittered signal;
the adjusting of the signal edge includes adjusting the rising signal edge of the jittered signal, and adjusting the falling signal edge of the jittered signal; and
the generating of the jitter corrected output signal including receiving the jitter corrected rising signal edge, the jitter corrected falling signal edge, and the count, and generating the jitter corrected output signal wherein the count is used to correct the signal rising edge and signal falling edge of the jittered signal.

39. The method of claim 31, wherein the correcting of the signal edge further comprises:
detecting a plurality of positions of the signal edge of the jittered signal;
generating an average detected signal edge position from the plurality of detected signal edge positions;
receiving the generated average signal edge position;
comparing the detected average signal edge positions to a plurality of stored signal edge reference positions; and
generating a jitter corrected edge position output that is: (i) a particular one of the stored signal edge reference positions when the average position is within a predetermined range of the particular stored reference position, and otherwise, that is (ii) the detected signal edge position.

40. The method of claim 39, wherein:
the detection of the signal edge includes detecting a signal rising edge of the jittered signal and a signal falling edge of the jittered signal;
the generating of the average detected signal edge position includes generating an average rising edge position from the detected signal rising edge positions and generating an average detected signal falling edge position from the detected signal falling edge positions; and
the comparator:
receiving the generated average signal rising and falling edge positions and (i) comparing the detected average signal rising edge positions to the stored signal rising edge reference positions, and (ii) comparing the detected average signal falling edge positions to the stored signal falling edge reference positions; and
generating a jitter corrected rising edge position and falling edge position outputs that are: (i) particular ones of the plurality of stored signal rising edge reference positions and signal falling edge positions when the generated average positions are within predetermined ranges of the particular stored rising edge and falling edge reference positions, and otherwise, that are (ii) the detected signal rising edge position and detected signal falling edge position.

41. A computer readable medium having instructions embodied thereon, which, when executed by a processing system, cause the system to perform a method comprising:
receiving a jittered signal;
correcting a signal edge of the jittered signal;
outputting a jitter corrected signal using the corrected signal edge;
receiving a base signal and generating a count from the base signal; and
generating a jitter corrected output signal from the jitter corrected signal edge and the count, wherein the count is used to correct the signal edge of the jittered signal.

42. The computer readable medium of claim 41, further including instructions which cause the system to perform the further method steps of:
the correcting of the signal edge further comprises detecting a signal edge of the uttered signal;
the correcting of the signal edge further comprises adjusting a signal edge of the jittered signal;
the jitter corrected signal edge comprises a jitter corrected rising signal edge, and the jitter corrected output signal has a jitter corrected rising signal edge; and the jitter corrected signal edge comprises a jitter corrected falling signal edge, and the jitter corrected output signal has a jitter corrected falling signal edge.

43. The computer readable medium of claim 42, further including instructions which cause the system to perform the further method steps of:

the detecting a signal edge includes detecting a rising signal edge of the jittered signal, and detecting a falling signal of the jittered signal;

the adjusting of the signal edge includes adjusting the rising signal edge of the jittered signal, and adjusting the falling signal edge of the jittered signal; and the generating of the jitter corrected output signal including receiving the jitter corrected rising signal edge, the jitter corrected falling signal edge, and the count, and generating the jitter corrected output signal wherein the count is used to correct the signal rising edge and signal falling edge of the jittered signal.

44. The computer readable medium of claim 41, further including instructions which cause the system to perform the further method steps of correcting of the signal edge further comprises:

detecting a plurality of positions of the signal edge of the jittered signal;

generating an average detected signal edge position from the plurality of detected signal edge positions;

receiving the generated average signal edge position;

comparing the detected average signal edge positions to a plurality of stored signal edge reference positions; and generating a jitter corrected edge position output that is: (i) a particular one of the stored signal edge reference positions when the average position is within a predetermined range of the particular stored reference position, and otherwise, that is (ii) the detected signal edge position.

45. The computer readable medium of claim 44, further including instructions which cause the system to perform the further method steps of:

the detection of the signal edge includes detecting a signal rising edge of the jittered signal and a signal falling edge of the jittered signal;

the generating of the average detected signal edge position includes generating an average rising edge position from the detected signal rising edge positions and generating an average detected signal falling edge position from the detected signal falling edge positions; and the comparator:

receiving the generated average signal rising and falling edge positions and (i) comparing the detected average signal rising edge positions to the stored signal rising edge reference positions, and (ii) comparing the detected average signal falling edge positions to the stored signal falling edge reference positions; and generating a jitter corrected rising edge position and falling edge position outputs that are: (i) particular ones of the plurality of stored signal rising edge reference positions and signal falling edge positions when the generated average positions are within predetermined ranges of the particular stored rising edge and falling edge reference positions, and otherwise, that are (ii) the detected signal rising edge position and detected signal falling edge position.

* * * * *